United States Patent [19]

Witte

[11] Patent Number: 4,722,564

[45] Date of Patent: Feb. 2, 1988

[54] APPARATUS FOR CLAMPING WORKPIECES

[75] Inventor: Horst Witte, Bleckede, Fed. Rep. of Germany

[73] Assignee: Horst Witte Entwicklungs- und Vertriebs KG, Bleckede, Fed. Rep. of Germany

[21] Appl. No.: 889,868

[22] Filed: Jul. 28, 1986

[30] Foreign Application Priority Data

Sep. 7, 1985 [DE] Fed. Rep. of Germany ....... 3532020

[51] Int. Cl.$^4$ .............................................. B65H 3/20
[52] U.S. Cl. ...................................... 294/1.1; 271/33; 221/210; 269/329
[58] Field of Search .......................... 156/349; 271/33; 221/210, 215; 294/1.1; 269/13, 7-8, 22, 66, 329

[56] References Cited

U.S. PATENT DOCUMENTS

| | | | |
|---|---|---|---|
| 3,521,801 | 7/1970 | Clupper | 269/22 X |
| 3,595,555 | 7/1971 | Cameron | 269/22 X |
| 3,797,875 | 3/1974 | Hamer | 221/210 X |
| 4,286,730 | 9/1981 | Ericsson | 221/215 |
| 4,591,139 | 5/1986 | Engelbart | 271/33 X |

FOREIGN PATENT DOCUMENTS 928559 6/1963 United Kingdom ................. 271/33

Primary Examiner—David Simmons
Attorney, Agent, or Firm—Staas & Halsey

[57] ABSTRACT

An apparatus for clamping workpieces made from varied materials and complicated shapes comprises a body and clamping member, which are formed by adhesive films which can be used a number of times. These adhesive films can be moved from a position above the clamping surface of the body into a position below the clamping surface. In the first position, the workpiece is e.g. reliably fixed by pressing down. The adhesive film is then lowered into the plane of the clamping surface, so that the workpiece rests thereon and is reliably and firmly supported there for machining purposes. The adhesive film simultaneously secures the workpiece in the machining position. When machining is ended, the adhesive film is lowered beneath the plane of the clamping surface, so that the adhesive connection can be broken and the workpiece removed. The adhesive film can be moved mechanically, e.g. by an eccentric drive, or alternatively by a hydraulic or pneumatic mechanism.

6 Claims, 9 Drawing Figures

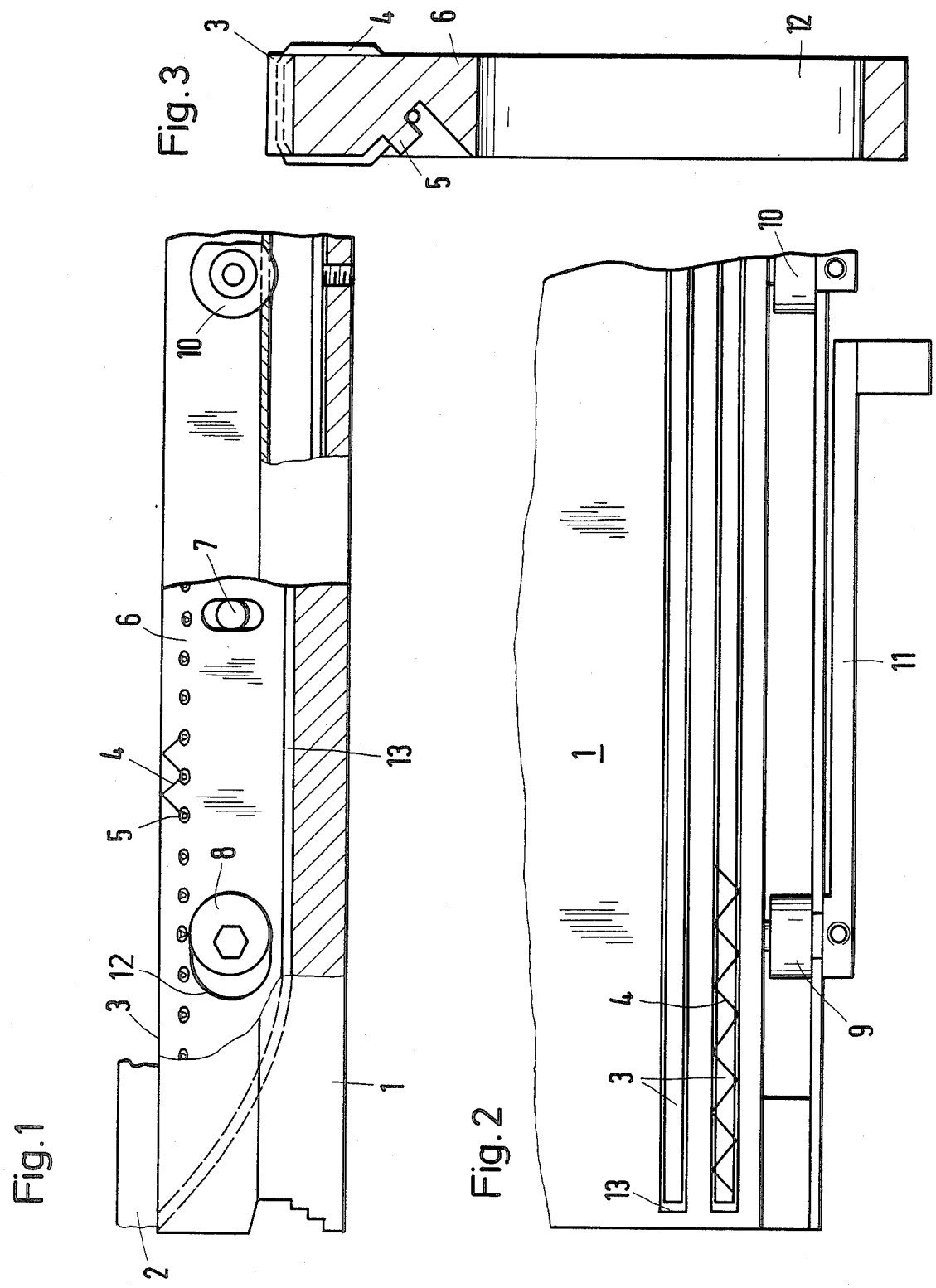

APPARATUS FOR CLAMPING WORKPIECES

BACKGROUND OF THE INVENTION

The present invention relates to an apparatus for clamping workpieces.

Numerous different constructions exist for such apparatuses. There are so-called vacuum clamping apparatuses, in which openings or slots are provided in the body or structure, are subject to the action of a vacuum and exert a suction action on the workpiece. Corresponding clamping devices are known, which function magnetically or merely mechanically.

Problems constantly occur, particularly in the case of specially shaped workpieces or workpieces made from specific materials, i.e. clamping onto the workpiece is either not possible or is not sufficiently reliable. For example, in the case of a porous material, it is not possible to maintain the vacuum. If the workpieces have a complicated configuration, the necessary sealing against the vacuum is difficult to achieve. Non-magnetizable materials cannot be fixed or clamped with magnetic apparatuses. Mechanical apparatuses are frequently unusable, because they damage the surface of sensitive workpieces.

SUMMARY OF THE INVENTION

The object of the present invention is to provide an apparatus for clamping workpieces which has a simple construction, but still permits a reliable clamping of the workpieces to be worked, particularly specially shaped workpieces. Clamping and unclamping are to take place rapidly and easily and the apparatus is to be frequently usable.

To overcome the prior art problems and achieve the objects of the invention, the apparatus for clamping workpieces comprises:

(a) a body and (b) clamping means for holding the workpiece on the clamping surface of the body, wherein the clamping means is formed by adhesive films which can be reused a number of times and which can be moved into at least three positions, the first position being above the clamping surface, the second position being in the clamping surface wherein the workpiece is simultaneously supported by the clamping surface and held by the adhesive film, and the third position being below the clamping surface.

According to the invention, use is made of a per se known adhesive film or a corresponding adhesive material, which can be used a number of times and e.g. washed off. Due to the fact that the adhesive film or films are correspondingly movable, they receive the workpiece in its position above the clamping surface and an adhesive connecton is ensured between the workpiece and adhesive film. If this connection is, e.g. produced by pressure action, the adhesive film is lowered to such an extent that the workpiece rests on the clamping surface, so that there is a corresponding abutment during machining. The adhesive surface of the adhesive film is then located in the plane of the clamping surface, so that the workpiece is reliably secured, supporting being provided by the actual body or structure. When the workpiece has been finished and the clamping action is to be removed, the adhesive film is moved beneath the level of the clamping surface, so that the adhesive connection is automatically removed and the workpiece can be taken away. The adhesive film is then again moved into a plane above the clamping surface, where it is ready for receiving the next workpiece. Such an apparatus can also be used for workpieces having a complicated shape, because it is unimportant whether all the adhesive faces of the adhesive films are or are not covered by the workpiece, as is the case with vacuum clamping means. It is also possible to fix workpieces made from non-magnetizable and porous materials.

In a preferred embodiment of the above clamping apparatus, the adhesive films are moved mechanically.

In another embodiment of the above clamping apparatus, the adhesive film is move pneumatically or hydraulically.

BRIEF DESCRIPTION OF THE DRAWINGS

The invention is described in greater detail hereinafter relative to non-limitative embodiments and the attached drawings, wherein:

FIG. 1 is a part sectional side view of a first embodiment of an apparatus according to the invention;

FIG. 2 is a plan view of the embodiment according to FIG. 1;

FIG. 3 is a cross-sectional view through the embodiment of FIGS. 1 and 2 on a larger scale;

DETAILED DESCRIPTION OF THE PREFERRED EMBODIMENTS

Figure 4:
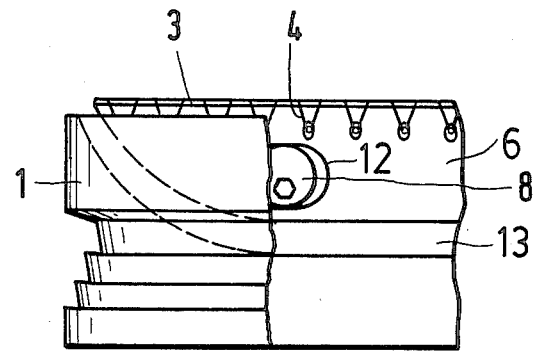
FIG. 4 is a partial view of the embodiment according to FIGS. 1 to 3, in which the adhesive film is located in a position above the clamping surface.
Figure 5:
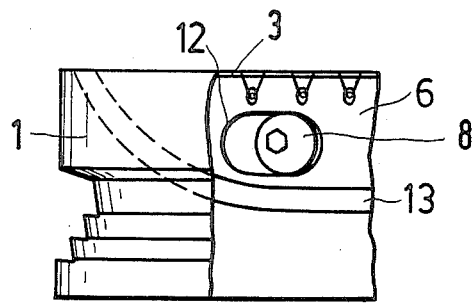
FIG. 5 is a view corresponding to FIG. 4; in which the adhesive film is located in a position in the clamping surface.
Figure 6:
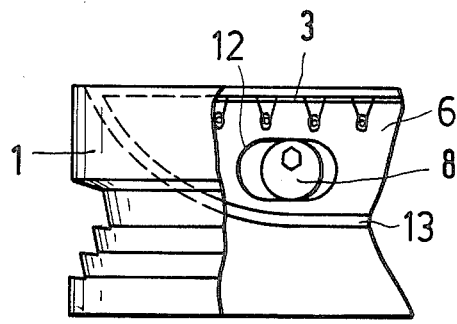
FIG. 6 is a view corresponding to FIGS. 5 and 6, in which the adhesive film is located below the clamping surface.

The apparatus shown in FIGS. 1 to 6 comprises a body 1, in which are formed a plurality of parallel slots 13. A bar 6 is mounted in such a way in each slot that it can be moved up and down.

The upward and downward movement takes place by means of cam 8. Eccentric shafts are rotated by means of pinions 9 and 10, which are interconnected by a rack (not shown). The drive takes place by means of a hand crank 11. A guide 7 ensures that the bars 6 are only moved up and down and not sideways.

On to the upper surface of each bar 6 is fixed a strip-like adhesive film 3, namely with the aid of threads 4, which are looped around pins 5, as can best be seen in FIG. 3. The oblong hole 12 shown in FIGS. 1 and 3-6 serves to receive cam 8. The threads 4 are pressed into the adhesive films 3, so that they are located below the surface of the latter, which can also be seen from FIG. 3.

In order to clamp a workpiece, the apparatus is brought into the position according to FIG. 4. The adhesive surface of the adhesive film 3 is ready to receive a workpiece 2 (FIG. 1), which is applied thereto and pressed on. The bars 6 with the adhesive films 3 are then moved into the position according to FIG. 5, in which the adhesive surface is located in the plane of the clamping surface. The clamping surface supports workpiece 2 and the adhesive surface secures it. When the workpiece is finished, bar 6 with the adhesive film 3 is moved into the position according to FIG. 6, i.e. the adhesive surface is located below the clamping surface, so that the adhesive connection between workpiece and adhesive film is automatically ended. The different positions of cam 8 during the above operation of the apparatus can also be gathered from FIGS. 4 to 6.

Figure 7:
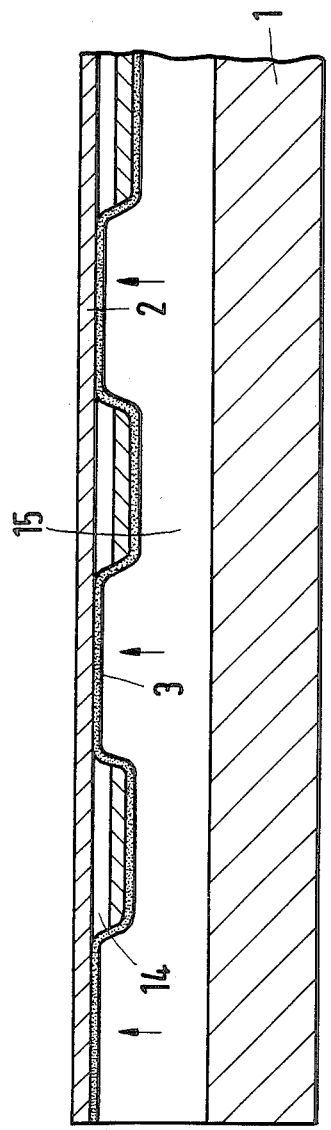
FIG. 7 is a diagrammatic view in section through another embodiment, in which the adhesive film is moved pneumatically or hydraulically and is positioned above the clamping surface.
Figure 8:
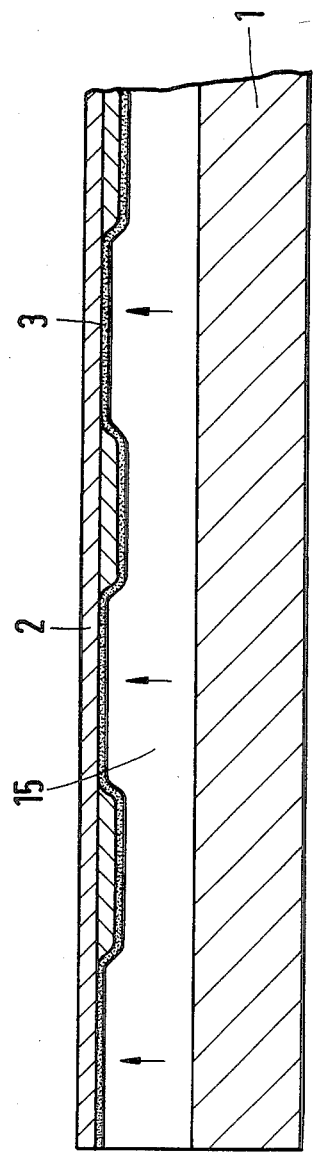
FIG. 8 is a view corresponding to FIG. 7, in which the adhesive film is located in the plane of the clamping surface.
Figure 9:
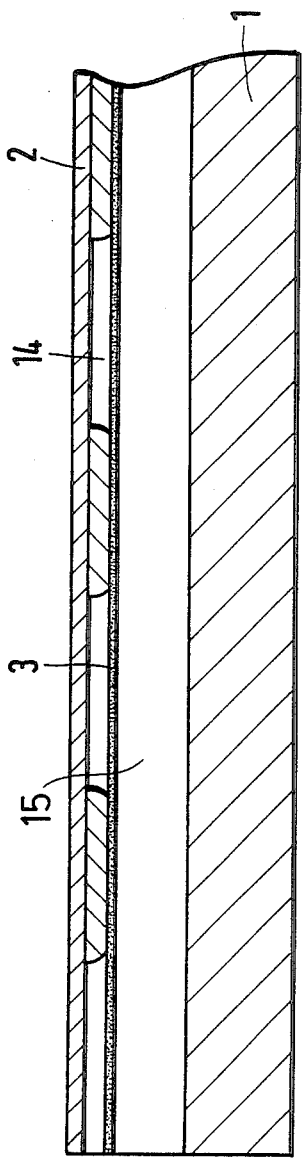
FIG. 9 is a view corresponding to FIGS. 7 and 8, in which the adhesive film is located below the plane of the clamping surface.

In the embodiment according to FIGS. 7 to 9, the film 3 is moved hydraulically or pneumatically. For this purpose, the clamping surface contains a plurality of openings or slots 14, whereof in each case several of these form a corresponding row in the surface of the clamping face. Adhesive film 3 is located in a pressure chamber 15 below the clamping face having the openings 14.

In the position according to FIG. 7, pressure chamber 15 is filled with a pressure medium, so that the adhesive film 3 is pressed over the plane of the clamping surface and the adhesive connection between workpiece 2 and adhesive film 3 can be formed. The pressure in pressure chamber 15 is reduced to such an extent that the adhesive face of adhesive film 3 is located in the plane of the clamping surface (cf. FIG. 8). The workpiece is held in this position and simultaneously the clamping surface forms a rigid abutment, so that machining can take place.

If the workpiece is then to be removed, the pressure in pressure chamber 15 is reduced again, so that the adhesive film assumes the position according to FIG. 9.

It is obvious that other embodiments are possible within the scope of the invention, in which the adhesive film can be moved from a level above the clamping surface for receiving and fixing the workpiece to a level below the clamping surface, and naturally back again, so as to permit the removal of the finished workpiece.

What is claimed is:

1. An apparatus for clamping workpieces comprising:
   (a) a body and
   (b) clamping means for holding the workpiece on the clamping surface of the body, wherein the clamping means is formed by adhesive films which can be reused a number of times and which can be moved into at least three positions, the first position being above the clamping surface, the second position being in the clamping surface wherein the workpiece is simultaneously supported by the clamping surface and held by the adhesive film, and the third position being below the clamping surface.

2. An apparatus according to claim 1, further comprising individual bars for affixing adhesive films thereto, the bars being mounted in the body and moveable up and down relative to the clamping surface.

3. An apparatus according to claim 2, further comprising an eccentric drive for moving the bars jointly up and down.

4. An apparatus according to claim 2, further comprising thin threads for fixing the adhesive films to the bars, the thin threads being pressed into the surface of the adhesive films.

5. An apparatus according to claim 1, wherein the clamping surface contains a plurality of openings, wherein the adhesive film is positioned below the clamping surface and is made from an elastic material and wherein the adhesive film can be moved pneumatically or hydraulically through the openings on a plane above the clamping surface.

6. An apparatus according to claim 5, wherein the body includes a pneumatic or hydraulic pressure chamber positioned adjacent the adhesive film and the clamping surface having the openings.

* * * * *